April 13, 1937. T. DARBY 2,077,311
BAIT
Filed March 30, 1936
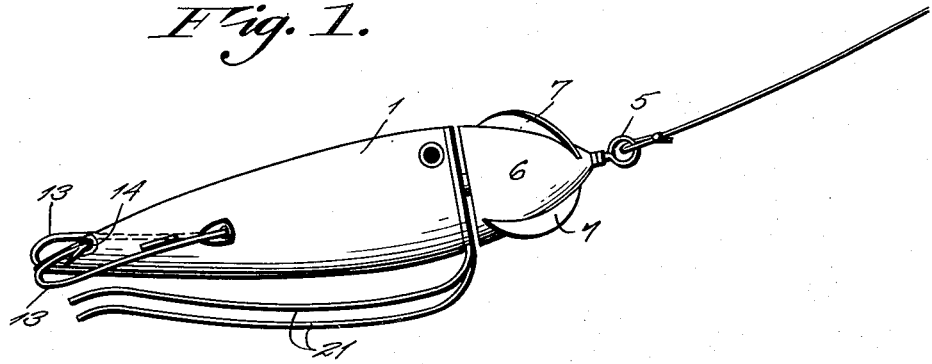
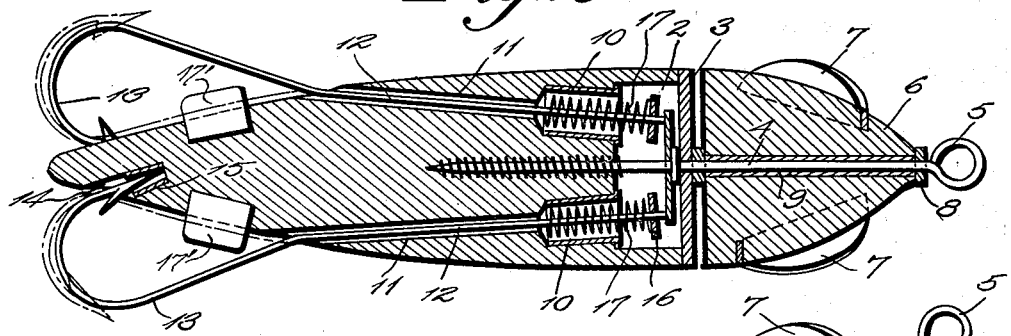
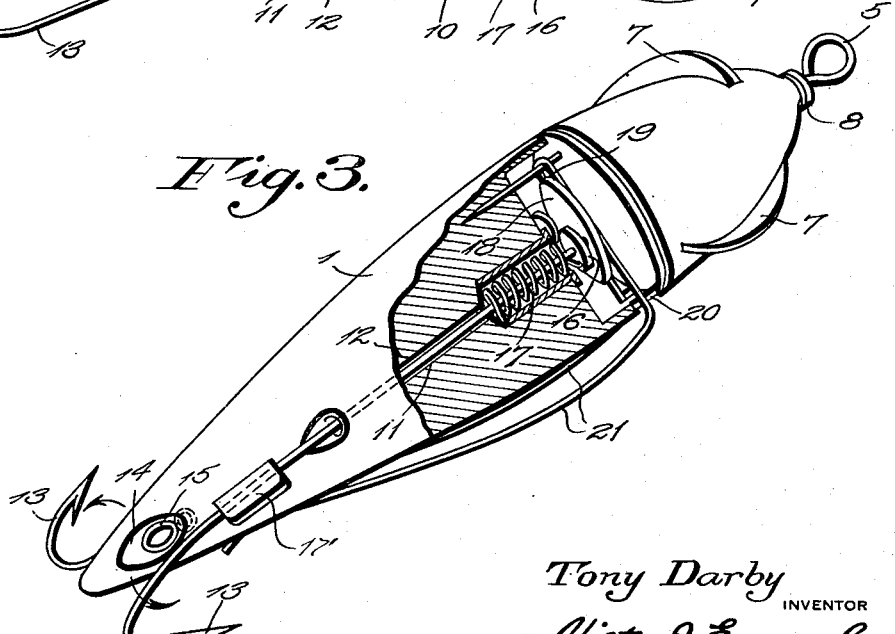
Tony Darby
INVENTOR
BY Victor J. Evans & Co.
ATTORNEY Patented Apr. 13, 1937

2,077,311

UNITED STATES PATENT OFFICE 2,077,311

BAIT

Tony Darby, Michigan City, Ind., assignor of one-half to Michael L. Darby, Whiting, Ind.

Application March 30, 1936, Serial No. 71,781

4 Claims. (Cl. 43—35)

This invention relates to artificial bait, and has for the primary object the provision of a device which is simple in construction, efficient in operation and weedless, that is, the device may be successfully moved through weeds and the like without becoming tangled or caught therein and which will be capable of attracting fish at a maximum distance.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating an artificial bait constructed in accordance with my invention.

Figure 2 is a vertical sectional view illustrating the same.

Figure 3 is a side elevation, partly in section, showing the hooks in fish catching position.

Referring in detail to the drawing, the numeral 1 indicates a body tapering towards one end and its largest end has formed therein a chamber 2 closed by a plate or disc 3. A rod 4 extends through the plate 3 and chamber 2 and is threaded in the body. The free end of the rod terminates in an eye 5 to which a fishing line may be connected. Journaled on the rod 4 between the eye 5 and the plate 3 is a head 6 tapering towards one end. The head 6 and body 1 cooperate in representing live bait and secured to the head are angularly disposed fins 7 acting to cause rotation of the head when the device is drawn through the water. It is preferable that the head be painted or otherwise coated with differentiating colors so that as the device moves through the water bringing about rotation of the head these colors will readily attract fish from a maximum distance. Spacing washers 8 are interposed between the head and the eye 5 and between said head and the plate 3 and it is preferable that the head have a ferrule 9 through which the rod 4 extends so that said head may freely rotate.

Pockets 10 are formed in the body 1 in communication with the chamber 2 and have in communication therewith passages 11 opening outwardly through walls of the body to receive the shanks 12 of fish hooks 13. The tail or small end of the body has notches 14 in which are located keepers 15 to receive the pointed ends of the hooks 13. The shanks 12 of the hooks extend into the chamber 2 and have secured thereto discs 16 and mounted in the pockets and chamber 2 are coil springs 17 each having one end secured to a disc 16 and the other end secured to a wall of the pocket. To position the pointed ends of the hooks 13 in the keepers, said hooks are rotated tensioning the springs 17. The shanks 12 of the hooks may slide in the passages 11 for the purpose of disengaging the pointed ends of the hooks from the keepers 15. The ends of the shanks of the hooks are engaged by a plate 18 slidable on the rod 4 and an arm 19 is pivotally mounted in the chamber laterally of the rod 4 and plate 18 and contacts one face of the plate and extends outwardly of the chamber by way of slots 20 in the form of curved and spaced triggers 21. The triggers extend rearwardly in the direction of the tail or pointed end of the body and due to the action of the springs 17 to expand the triggers are normally held slightly spaced from the body, as shown in Figure 1. When a fish strikes or takes the body 1, the triggers are engaged and moved in the direction of the body, causing the arm 19 to pivot and exert pressure on the plate 18 which in turn slides the shanks 12 of the hooks rearwardly disengaging the pointed ends from the keepers 15. As soon as the pointed ends of the hooks become disengaged from the keepers, the shanks 12 are caused to rotate by the springs 17 positioning the hooks so as to extend outwardly from the tail end of the body and in a position to catch into the fish's mouth. Thus it will be seen that during the movement of this device through the water and until such time that it is struck by a fish the pointed ends of the hooks are turned in the direction of the body and received by the keepers preventing the hooks from catching into weeds and the like.

Stops 17' are secured to the body to be engaged by the hooks when moved to extend outwardly with respect to the body by the action of the springs 17.

Having described the invention, I claim:

1. An artificial bait comprising a body, line attaching means secured to the body, a head journaled on said means, means for causing the head to rotate as the body is drawn through the water, hooks slidably and rotatably mounted in the body and normally turned to extend in the direction of the body to prevent catching into weeds, means for temporarily retaining the hooks in said position, spring means acting on the hooks to turn the hooks outwardly of the body when free, and means for freeing the hooks when engaged by a fish.

2. An artificial bait comprising a body having a chamber, a line attaching means secured to the body, a head carried by said means, said body having passages opening outwardly through the sides thereof and in communication with the chamber, hooks including shanks slidable in said passages and terminating in the chamber, keepers carried by said body to receive the pointed ends of the hooks, spring means for rotating the hooks to extend outwardly of the body when disengaged from the keepers, and a trigger means for disengaging the hooks from the keepers.

3. An artificial bait comprising a body having a chamber, a line attaching means secured to the body, a head carried by said means, said body having passages opening outwardly through the sides thereof and in communication with the chamber, hooks including shanks slidable in said passages and terminating in the chamber, keepers carried by said body to receive the pointed ends of the hooks, spring means for rotating the hooks to extend outwardly of the body when disengaged from the keepers, a plate engageable with the shanks of the hooks, and an arm pivoted in the chamber and engaging said plate and extending outwardly of the chamber and rearwardly of the body in the form of triggers to be engaged by a fish and moved in the direction of the body to impart endwise movement to the hooks and thereby disengage the pointed ends from the keepers and permit the spring means to act to turn the hooks outwardly with relation to the body.

4. An artificial bait comprising a body having a chamber, a line attaching means secured to the body, a head carried by said means, said body having passages opening outwardly through the sides thereof and in communication with the chamber, hooks including shanks slidable in said passages and terminating in the chamber, keepers carried by said body to receive the pointed ends of the hooks, spring means for rotating the hooks to extend outwardly of the body when disengaged from the keepers, a plate engageable with the shanks of the hooks, an arm pivoted in the chamber and engaging said plate and extending outwardly of the chamber and rearwardly of the body in the form of triggers to be engaged by a fish and moved in the direction of the body to impart endwise movement to the hooks and thereby disengage the pointed ends from the keepers and permit the spring means to act to turn the hooks outwardly with relation to the body, and stops secured to the body to be engaged by the hooks when moving in the latter-named position.

TONY DARBY.